Patented Apr. 25, 1933

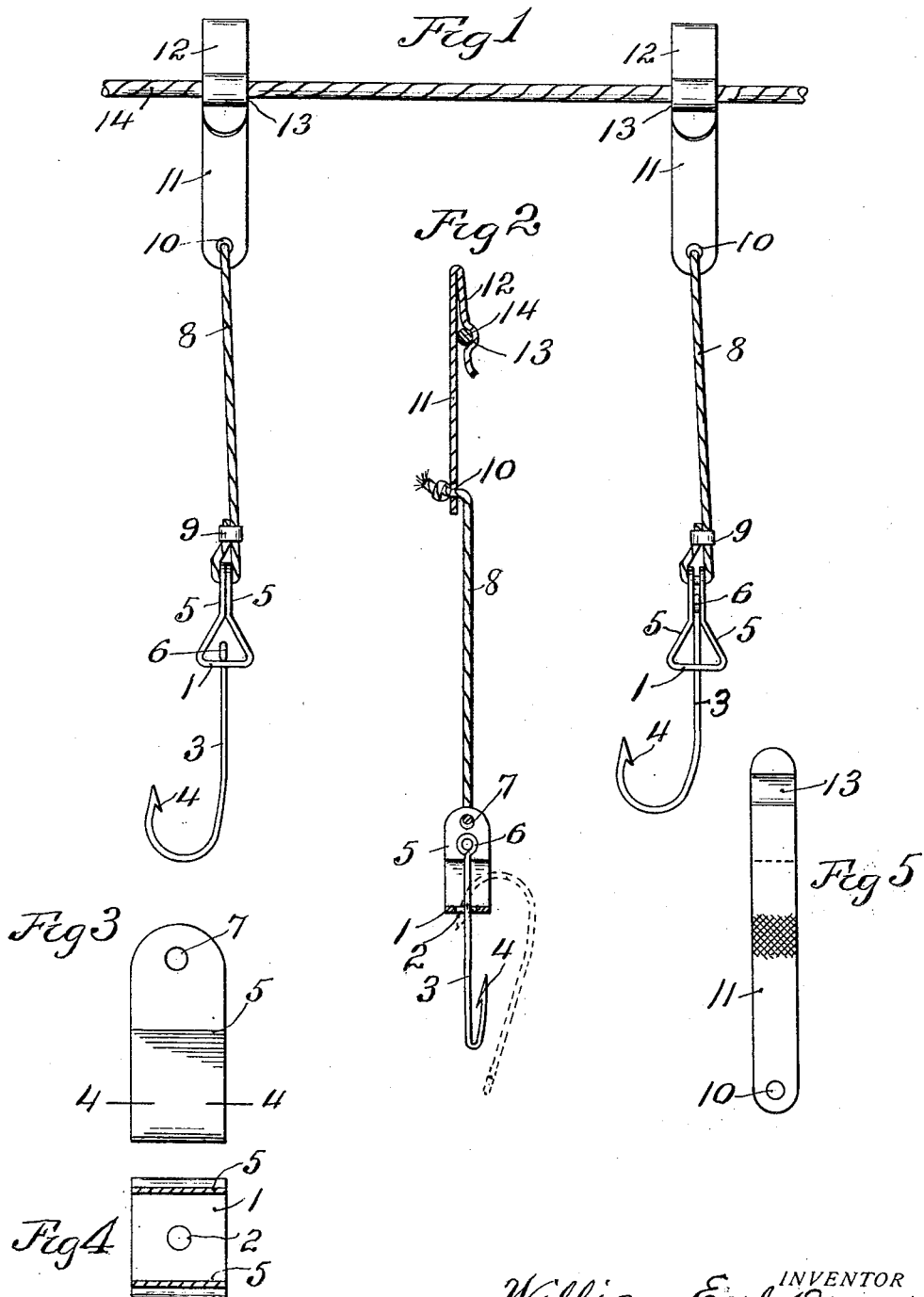

1,905,449

UNITED STATES PATENT OFFICE

WILLIAM EARL DUNN, OF KANSAS CITY, MISSOURI

FISHHOOK FASTENING MEANS

Application filed March 9, 1932. Serial No. 597,703.

My invention relates to improvements in fishhook fastening means.

One object of my invention is to provide novel means by which a fishhook may be easily and quickly attached to or disconnected from a snell. A further object of my invention is to provide novel means by which the snell may be easily and quickly attached to or disconnected from a trotline.

Another object of my invention is to provide novel fastening means of the kind described, which is simple, cheap, strong, not likely to get out of order, which will securely hold the hook and yet permit of its ready detachment and which will prevent the snell fastening means slipping on the trot line but will permit of its quick and easy adjustment to any desired position along the line.

The novel features of my invention are hereinafter fully described and claimed.

In the accompanying drawing, which illustrates my improved fishhook fastening means, Fig. 1 is a side elevation showing two hooks attached to a trot line with my improved fastening means.

Fig. 2 is a side view of a fishhook shown attached to a trot line, the latter, the snell attaching plate and the hook attaching member being shown in vertical section.

Fig. 3 is an enlarged elevation of the fishhook attaching member.

Fig. 4 is a section on the line 4—4 of Fig. 3.

Fig. 5 is a plan view of the snell attaching plate prior to its being folded.

Similar characters of reference designate similar parts in the different views.

My improved fishhook attaching member comprising a resilient plate of brass, steel or other suitable material having a horizontal transverse portion 1 provided therethrough with a hole 2 through which is adapted to be inserted the shank 3 of a fishhook, having at one end a barb 4 which is of less diameter than the diameter of the hole 2, so that the hook barb may be inserted through the hole, as shown in dotted lines in Fig. 2.

The attaching member has two arms 5 which extend upwardly from the transverse portion 1 at opposite sides respectively of the hole 2, and which, preferably, converge upwardly from the ends of the transverse portion 1 and have their adjacent sides normally against each other.

The arms 5 are adapted to be sprung apart and to have inserted between and releasably gripped by them an enlarged part, such as the usual eye 6, at the upper end of the shank 3, as shown in Fig. 2 and at the right in Fig. 1.

The enlarged part 6 has its greatest diameter greater than the diameter of the hole 2, so that, when the baited hook is seized by a fish and the part 6 is withdrawn from between the arms 5, the said enlarged part will rest on the upper side of the transverse portion 1, as shown at the left in Fig. 1.

The arms 5 each has a transverse hole 7 through which is inserted one end of a snell 8, said end being fastened by a clip 9. The other end of the snell 8 is extended through a hole 10 in an end portion of a resilient plate 11, of brass, steel or other suitable material. The adjacent end of the snell is made secure in the plate 11 as by knotting the adjacent end portion, as shown in Fig. 2.

An end portion of the plate 11, opposite to the end portion having the hole 10, is folded onto the plate 11 to form an arm 12 which on its inner side has a transverse groove 13 into which is adapted to be slipped a trot line 14, the diameter of which should be such that the line will be tightly gripped between the arm 12 and the body of the plate 11, thus preventing the latter from being slipped along the line, due to tugging on the hook by a fish. The free end of the arm 12 is turned outwardly to enable the line 14 to be slipped easily into the groove 13.

In use, the hook has its barb 4 inserted downwardly through the hole 2, as shown in dotted lines in Fig. 2, the shank being passed downwardly through the hole until the eye 6 of the hook rests on the transverse portion 1 of the hook attaching member. To hold the hook from swinging around in the hole 2, the hook is then moved upwardly in the hole to a position in which the eye 6 will force apart the arms 5, which will grip the eye 6 and firmly hold the hook, as shown at the right in Fig. 1.

The snell attaching plate 11 is then slipped into engagement with the trot line 14 in the manner already described.

When a fish seizes the bated hook, the hook will be pulled downwardly until the eye 6 strikes the transverse portion 1, which portion will hold the hook.

Any pull on the plate 11 in a direction lengthwise of the trot line 14 by the snell 8 will tend to crimp the line and will not cause the plate to slide on the line.

I do not limit my invention to the structure shown and described, as modifications, within the scope of the appended claims, may be made without departing from the spirit of my invention.

What I claim is:—

1. In a fishhook fastening means, the combination with a fishhook having a shank, a barb at one end of said shank and an enlarged part at the upper end of said shank, of an attaching member having a transverse portion provided with a hole therethrough through which said shank extends, said hole having a diameter less than the largest diameter of said enlarged part, whereby said portion may support said hook, said member having two arms extending upwardly from said portion at opposite sides respectively of said hole, said arms having means for attachment to a snell.

2. In a fishhook fastening means, the combination with a fishhook having a shank, a barb at one end of said shank and an enlarged part at the upper end of said shank, of an attaching member having a transverse portion provided therethrough with a hole of larger diameter than the diameter of said barb and of less diameter than the greatest diameter of said enlarged part, whereby said barb may be passed through said hole, and said enlarged part will be supported on the upper side of said portion, said member having two arms extending upwardly from said portion at opposite sides respectively of said hole; said arms having means for attachment to a snell.

3. In a fishhook fastening means, the combination with a fishhook having a shank, a barb at one end of said shank and an enlarged part at the other end of said shank, of an attaching member having a transverse portion provided therethrough with a hole of larger diameter than the diameter of said barb and of less diameter than the greatest diameter of said enlarged part, whereby said barb may be passed through said hole and said enlarged part may be supported on the upper side of said portion, said member having two arms extending upwardly from said portion at opposite sides of said hole respectively and having means for attachment to a snell, said arms being adapted to be spread apart and grip said enlarged part so as to support said hook with said enlarged part releasably held thereby in a position elevated above said transverse portion.

4. In a fishhook fastening means, the combination with a fishhook having a shank, a barb at one end of said shank and an enlarged part at the other end of said shank, of an attaching member having a transverse portion provided therethrough with a hole through which said shank extends having a diameter less than the greatest diameter of said enlarged part, whereby the latter may be supported on the upper side of said portion, said member having two arms extending upwardly from said portion at opposite sides respectively of said hole for releasably gripping between them said enlarged part and for supporting it elevated above said portion, said arms having means for attachment to a snell.

5. In a fishhook fastening means, an attaching member having a transverse portion provided therethrough with a hole for having extended therethrough the shank of a fishhook, said transverse portion having means for supporting an enlarged part of said shank, said member having two arms extending upwardly from said portion at opposite sides respectively of said hole and having each a hole for receiving a snell, the upper portions of said arms being disposed closely adjacent to each other and having means for releasably gripping said enlarged part and for supporting it elevated above said portion.

In testimony whereof I affix my signature.

WILLIAM EARL DUNN.